United States Patent [19]

Hausmann et al.

[11] Patent Number: 6,090,454

[45] Date of Patent: Jul. 18, 2000

[54] POLYMER COATING FOR LOW ELECTRICALLY CONDUCTIVE MATERIALS

[75] Inventors: Karlheinz Hausmann, Auvernier, Switzerland; Thierry Vanlancker, Princeton, N.J.

[73] Assignee: E.I. du Pont de Nemours and Company, Wilmington, Del.

[21] Appl. No.: 09/155,263

[22] PCT Filed: Mar. 24, 1997

[86] PCT No.: PCT/US97/04706

§ 371 Date: Sep. 24, 1998

§ 102(e) Date: Sep. 24, 1998

[87] PCT Pub. No.: WO97/35670

PCT Pub. Date: Oct. 2, 1997

[30] Foreign Application Priority Data

Mar. 28, 1996 [EP] European Pat. Off. .............. 96200844

[51] Int. Cl.[7] ....................................................... B05D 1/22
[52] U.S. Cl. .......................... 427/559; 427/105; 427/106; 427/180; 427/230; 427/508
[58] Field of Search .................................... 427/508, 557, 427/559, 105, 106, 180, 230, 236

[56] References Cited

U.S. PATENT DOCUMENTS

| | | | |
|---|---|---|---|
| 3,264,272 | 8/1966 | Rees | 260/78.5 |
| 3,895,126 | 7/1975 | Strauss et al. | 427/29 |
| 4,230,068 | 10/1980 | Itoh et al. | 118/634 |
| 4,315,573 | 2/1982 | Bradley et al. | 215/12 R |
| 4,321,337 | 3/1982 | Smith | 525/329 |
| 4,351,931 | 9/1982 | Armitage | 526/227 |
| 4,377,603 | 3/1983 | Itoh et al. | 427/25 |

FOREIGN PATENT DOCUMENTS

| | | | |
|---|---|---|---|
| 2424220 | 11/1975 | Germany | E06B 3/04 |
| 2750370 | 5/1978 | Germany | B05B 5/08 |
| 2750372 | 5/1978 | Germany | B05B 5/08 |

OTHER PUBLICATIONS

PCT International Search Report for International Application No. PCT/US97/04706 (No Date Avail.).

*Primary Examiner*—Bernard Pianalto
*Attorney, Agent, or Firm*—Craig H. Evans

[57] ABSTRACT

A process for forming a coating of a thermoplastic polymer on a hollow object formed of a low electrically conductive material is described, characterized in that the thermoplastic polymer has its maximum IR absorption between 1300 and 1900 nm and/or 2800 and 3000 nm, is applied electrostatically as a powder to the object while the objet is held at a temperature below the melting point of the thermoplastic polymer, and thereafter the object is heated by IR radiation to form the coating.

8 Claims, No Drawings

POLYMER COATING FOR LOW ELECTRICALLY CONDUCTIVE MATERIALS

The present invention relates to a process for providing a hollow object formed of a low electrically conductive material with a coating of a thermoplastic polymer, and in a preferred embodiment, providing a glass or ceramic container with a coating of an ionomeric polymer.

BACKGROUND OF THE INVENTION

Polymer coatings are provided on objects having low electrical conductivity such as ceramics and glass for a variety of reasons such as for weight savings, shatter protection, aesthetics and touch. In particular, providing shatter protection to glass bottles containing carbonated beverages is of particular importance where the glass bottles are defective or mishandled.

Polymeric coatings can be applied by various means. The objects to be coated can be dipped into a polymeric melt or can be dipped into a fluidised bed of polymer powder particles. It is also known to coat objects using an electrostatic powder spraying process; c.f. DE 2424220, DE 2750370 C2 and DE 2750372 C2.

DE 2750370 C2 and DE 2750372 C2 disclose electrostatic spray coating processes in which the substrate (a glass bottle) is maintained at a temperature below the melting point of the polymer, and the powder is applied by way of silent discharge. Afterwards, the bottle is heated to melt the powder to form a coating, which is subsequently cured. These processes, however, require high investment costs, can lead to corrosion of the equipment as they require continuous discharge, have limitations to the speed at which they can be carried out, require the use of very fine polymer powder which is expensive to produce, often produce non-uniform coatings due to local discharges at the bottle surface, and can be dangerous to carry out due to shattering of the bottles during heating and quenching steps.

These disadvantages are overcome by the current invention.

DETAILED DESCRIPTION OF THE CURRENT INVENTION

The present invention provides a process for forming a coating of a thermoplastic polymer to a hollow object formed of a low electrically conductive material, characterised in that the thermoplastic polymer has its maximum IR absorption between 1300 and 1900 nm and/or 2800 and 3000 nm, is applied electrostatically as a powder to the object while the object is held at a temperature below the melting point of the thermoplastic polymer, and thereafter the object is heated by IR radiation to form the coating.

Advantages of the process include the hollow objects, e.g. glass bottles, can be taken directly from the annealing ovens of the glass bottle plants, thereby avoiding the need for large, expensive to preheat the objects prior to coating;

coating output is increased considerably;

potentially dangerous electric discharge and vacuum equipment is not needed;

more uniform coatings can be obtained using less expensive, larger particle size polymer.

As mentioned, suitable thermoplastic polymers to be used in the process according to the invention will have their maximum IR absorption between 1300 and 1900 nm and/or 2800 and 3000 nm. Preferred such polymers are ethylene/acid copolymers and ethylene/acid/acrylate terpolymers and their corresponding ionomers.

Ethylene/acid copolymers and their corresponding ionomers are well known in the art to be copolymers of ethylene with an olefinically unsaturated organic acid such as acrylic or methacrylic acid, the acid comprising about 1 to 50 mole percent of the total polymeric material. The ethylene/acid copolymers and their methods of preparation are well known in the art and are disclosed in, for example U.S. Pat. Nos. 3,264,272, 3,404,134, 3,355,319 and 4,321,337. The copolymers are termed ionomers when the acid is neutralized in whole or in part, preferably up to 80% to produce a salt. The cation for said salts may be a metal ion chosen from the first, second or third group of the periodic table of elements, and is preferably an alkali metal such as sodium, potassium or zinc.

Ethylene/acid/acrylate terpolymers and corresponding ionomers are well known in the art to be terpolymers of the aforementioned ethylene and olefinically unsaturated organic acids, together with an alkyl acrylate or methacrylate (e.g. ethylacrylate, n-butyl acrylate, isobutylacrylate or methacrylate). The terpolymers will typically contain between 1 and 40 weight % of alkyl acrylate or methacrylate, 1 and 50 weight % unsaturated organic acid and 50 and 98 weight % ethylene.

Preferred ionomers are copolymers of ethylene and 1 to 50%, more preferably 5 to 25%, by weight acrylic or methacrylic acid neutralized up to about 90%, more preferably from 5 to 60% with an alkali metal ion or a divalent or trivalent metal ion, the melt index of the copolymer, whether neutralized or unneutralized, being about 0.1 to 60, preferably 20 to 40, dg/min. according to ASTM Standard D1238 (condition E).

Suitable acid copolymers and ionomers are available from the DuPont Company under the trade names Nucrel® and Surlyn®, respectively, and are generally described U.S. Pat. Nos. 3,264,272 and 4,351,931.

The thermoplastic polymer powders used in the present invention will typically have a particle size up to about 300 microns, and will preferably be from 100 to 250 microns in size. These polymer powders can be made by usual techniques, such as cryogenic grinding.

Equipment for carrying out electrostatic spray coating and its general operation is known.

A general procedure for the process according to the present invention is as follows. A hollow object, e.g. glass bottle, maintained at a temperature below 100° C., is placed into an electrostatic spray booth without preheating. In the spray booth, a steel rod is placed in contact with the inside of the bottle, thereby establishing an electrostatic potential between powder to be applied to the bottle and bottle. The powder is electrically charges and applied to the bottle in a uniform manner. The bottle is then placed either in an oven (conventional or IR, according to the example followed) to melt the polymer powder. The IR oven will be configured to permit the optimum wavelength absorbed by the polymer used and may be equipped with ventilation to avoid high temperatures. Subsequently, the bottle is passed to an air cooling step and is cooled to room temperature.

The coating applied to the object will generally have a thickness up to 200 microns, preferably from 80 to 150 microns.

EXAMPLES

Ionomer 1:
   ethylene methacrylic acid copolymer (EMAA)-Neutralised Na—10% MAA

MFI (190° C./2.16 kg)=10 dg/min.
Ionomer 2:
Copolymer EMAA-Neutralised Zn—10% MAA
MFI=30 dg/min.
Acid Copolymer 1:
Copolymer EMAA—15% MAA
MFI=60 dg/min.

Conventional oven: gas operated hot air oven, make Glasbeek, having the dimensions: 17×3×50 m with a built in conveyor belt forming 4 serpentines.

Example 1

A lightweight 1 liter glass bottle (weight 415 g), maintained at 23° C., and into which a steel rod making contact with glass is inserted, is electrostatically sprayed with ionomer 1 powder (particle size up to 225 micron).

The bottle is put, top down and rotating at 15 rpm between four Elstein IR 2000 elements, two being locate on each side of the bottle. The bottom of bottle is heated with a fifth Elstein IR element. The distance between elements and bottle is 6 cm.

The surface temperature of the elements is set at 722° C., which creates the preferentially absorbed wavelength for this ionomer type.

The powder becomes a complete smooth melt in seven minutes. During cooling in ambient air no significant haze is observed. The coating thickness is between 120 and 160 microns

Example 2

Example 1 is repeated with acid copolymer 1 powder (particle size 0–275 micron). Despite a higher MFI, it requires 12 minutes to achieve good coating. Upon cooling, haziness is observed.

Example 3

Example 1 is repeated with ionomer 2 (particle size 75–275 micron). No haziness after cooling, 6 min 30 seconds until flow-out, low orange peel.

Control—Conventional Oven

A bottle is coated according to Example 3, with the exception that a convention oven is used in place of the IR elements. There is a heating time of 15 minutes to reach 210° C., flow out takes 10 minutes and a further 10 minutes is required for cooling. The coating thickness is between 200 and 260 microns.

What is claimed is:

1. A process for forming a coating of a thermoplastic polymer on a hollow object formed of a low electrically conductive material comprising applying thermoplastic polymer having a maximum IR absorption between 1300 and 1900 nm and/or 2800 and 3000 nm electrostatically as a powder to the object while the object is held at a temperature below the melting point of the thermoplastic polymer, and thereafter heating the object by IR radiation from an IR source adjusted to the preferential absorption wavelength of the thermoplastic polymer to form the coating.

2. A process according to claim 1 wherein the polymer is a copolymer of ethylene and an olefinically unsaturated organic acid, contains from 1 to 50 weight % of unsaturated monocarboxylic acids and is optionally neutralized up to 80% with at least one metal ion chosen from the $1^{st}$, $2^{nd}$ or $3^{rd}$ group of the periodic table.

3. A process according to claim 1 wherein the polymer is a copolymer of ethylene and 5 to 25% by weight acrylic or methacrylic acid neutralized from 5 to 60% with an alkali metal ion selected from the group consisting of sodium, potassium or zinc.

4. A process according to claim 2 wherein the copolymer further contains between 1 and 40 weight % of at least one acrylate selected from the group consisting of methyacrylate, iso-butylacrylate, n-butylacrylate and ethylacrylate.

5. A process according to claim 1 wherein the low electrically conductive material is glass.

6. A process according to claim 1 wherein the hollow object is at a temperature below 100° C. at the time the thermoplastic resin is applied.

7. A process according to claim 1 wherein the thermoplastic polymer powder has a particle size of up to 300 microns.

8. A process according to claim 1 wherein the coating has a thickness of up to 200 microns.

* * * * *